United States Patent

[11] 3,604,633

[72] Inventor Donald C. Estes
 Rte. 4, Winchester, Ky. 40391
[21] Appl. No. 1,235
[22] Filed Jan. 7, 1970
[45] Patented Sept. 14, 1971
 Continuation-in-part of application Ser. No.
 824,544, May 14, 1969, now abandoned.

[54] ONE-WAY SPREADER
 9 Claims, 9 Drawing Figs.
[52] U.S. Cl. ........................................................ 239/513,
 239/523, 239/666
[51] Int. Cl. ........................................................ B05b 1/26
[50] Field of Search ........................................... 222/368,
 410, 178; 239/523, 513, 507, 666

[56] References Cited
UNITED STATES PATENTS

| | | | |
|---|---|---|---|
| 1,101,530 | 6/1914 | Eilts .............................. | 239/666 |
| 1,291,436 | 1/1919 | Dennis .......................... | 239/666 |
| 2,317,274 | 4/1943 | Johnson ........................ | 222/368 X |

Primary Examiner—Stanley H. Tollberg
Attorney—Melville, Strasser, Foster & Hoffman ABSTRACT: Apparatus for distributing particulate material from a moving vehicle comprising a cylindrical housing, a plurality of impeller blades mounted for rotation in a vertical plane within the housing, means for feeding material into the lower part of the housing, an arcuate opening in the upper part of the housing, an elongated extension pivotally mounted to the housing at the upstream edge of the arcuate opening, the extension being movable about the pivotal mounting in a vertical plane, and a hood surrounding the extension at least on the top and two sides thereof.

PATENTED SEP 14 1971 3,604,633

INVENTOR/S
DONALD C. ESTES

BY Melville, Strasser, Foster and Hoffman
ATTORNEYS

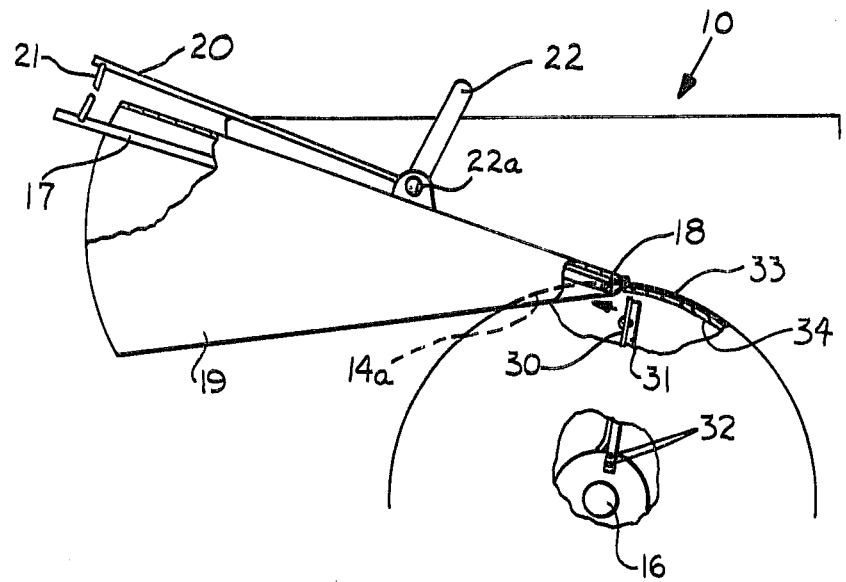
FIG. 5
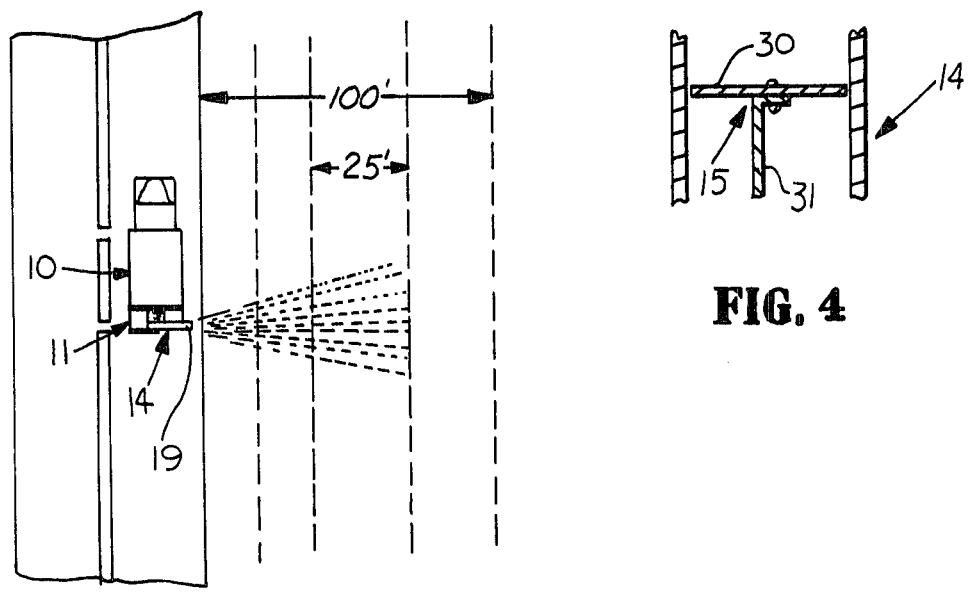
FIG. 7
FIG. 4
INVENTOR/S
DONALD C. ESTES
BY *Melville, Strasser, Foster and Hoffman*
ATTORNEYS

PATENTED SEP 14 1971 3,604,633

INVENTOR/S

DONALD C. ESTES

BY *Melville, Strasser, Foster and Hoffman*
ATTORNEYS

ONE-WAY SPREADER

CROSS-REFERENCE TO RELATED APPLICATION

This application is a continuation-in-part of application Ser. No. 824,544, filed May 14, 1969, now abandoned by Donald C. Estes.

BACKGROUND OF THE INVENTION

1. Field of the Invention

This invention relates to portable equipment for distributing and broadcasting materials, such as limestone, fertilizer, mixtures thereof, seed, insecticides, straw, wood chips, compost, and the like, along the edges of roads, and in orchards and fields. A moving vehicle holding a supply of the material to be distributed moves along a road, or through an orchard or field, and the material is continuously discharged from one side of the vehicle, by apparatus mounted on the rear of the vehicle, in a trajectory which causes accurate and uniform dispersal along a path of predetermined width and distance from the vehicle parallel to the direction of movement thereof. When a path of the desired length has been deposited on the ground, the vehicle returns to the starting point and disperses a second path bordering or slightly overlapping the first path. Each path may be 25 or 30 feet in width, and the apparatus of the present invention is capable of discharging the material a distance of up to 95 to 100 feet. Thus an area up to about 100 feet wide can be treated in four passes.

2. Description of the Prior Art

The conventional means for applying ground limestone and ground limestone and fertilizer mixtures are to areas bordering roads and highways involves preparation and spraying of a water slurry of the materials. Such a procedure requires several pieces of equipment, including a tank truck to haul water to remote locations, mixing equipment and spraying equipment, all of which must be portable. Three or four operators are required, and the maximum amount of material which can be applied with this equipment is about 25 tons per day.

U.S. Pat. No. 1,866,806, issued July 12, 1932, to L. F. Holly, discloses portable equipment for spraying dry granular materials comprising an ejector nozzle having supply means at one end through which the granular material and compressed air are supplied to the nozzle in separate streams and enter the nozzle along convergent paths. The outlet from the nozzle is surrounded by two parallel sideplates and vertically spaced upper and lower plates, these upper and lower plates being pivotally mounted on horizontal axes for adjustment of a convergent relation to each other, in order to vary the angle of discharge of the material from the nozzle. In the experimental work leading to the development of the present application, applicant tested a structure responding to that disclosed in the Holly patent and found that high density material could not be discharged from such a nozzle a distance substantially greater than 10 feet. The convergent upper and lower plates interfered with the trajectory of the discharged material regardless of the angle of adjustment thereof, and the compressed air imparted insufficient velocity to carry the material more than a few feet. The structure of this patent was thus found to be operative only for loose, bulk material of low density, such as grain, chopped straw, etc.

SUMMARY

The present invention provides portable equipment which has particular utility in distributing finely divided, high density materials which can be applied at a rate as high as 100 tons per day by only one operator. The cost of the equipment of the present invention is about one-half to one-third that of the conventional equipment required for dispensing or discharging similar material in a water slurry.

The apparatus of the invention comprises a plurality of impeller blades which are rotated within a cylindrical drum or housing mounted on the rear of a vehicle, the blades picking up material fed into the lower part of the drum from the body of the vehicle and releasing or discharging the material through an arcuate opening in the upper part of the housing. An elongated extension is pivotally mounted to the housing, at the leading or "upstream" edge of the arcuate opening with respect to the direction of rotation, in such manner as to permit the rotational and centrifugal velocity imparted to the material by the impeller blades to be translated smoothly into linear velocity. The material is thus propelled outwardly through the opening in a relatively narrow stream with substantially no loss of kinetic energy and at the top of its trajectory is caused by air currents to spread and drop to the ground in a uniform pattern of coverage.

The present invention thus provides a single piece of equipment which avoids the disadvantages of water slurry distribution, the latter requiring several operators, a supply of water for mixing with the material, mixing equipment and an agitator to keep the solid material in suspension until it is sprayed. Moreover, the apparatus of the present invention can be built at a fraction of the cost of conventional equipment required for distribution of such material in the form of an aqueous slurry.

The apparatus provides the further advantage of discharging dry, high density material a distance as great as 100 feet in a controllable stream which deposits uniformly on the surfaces to be treated.

BRIEF DESCRIPTION OF THE DRAWINGS

Reference is made to the accompanying drawings wherein:

FIG. 4 is a fragmentary sectional view taken on the line 4—4 of FIG. 3;

FIG. 5 is a fragmentary perspective view with some parts broken away for purposes of illustration;

FIG. 7 is an illustration of the manner of operation of the apparatus of the invention;

DESCRIPTION OF THE PREFERRED EMBODIMENTS

Figure 1:
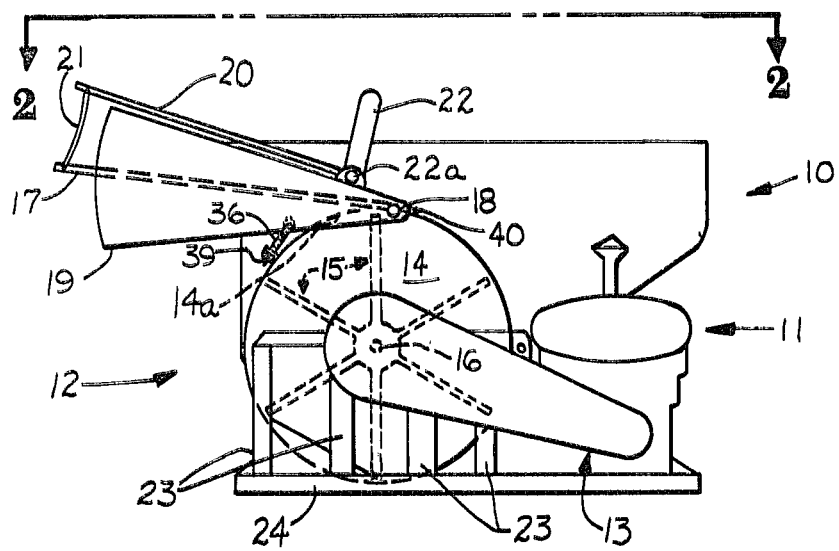
FIG. 1 is a schematic perspective view of apparatus embodying the invention.
Figure 2:
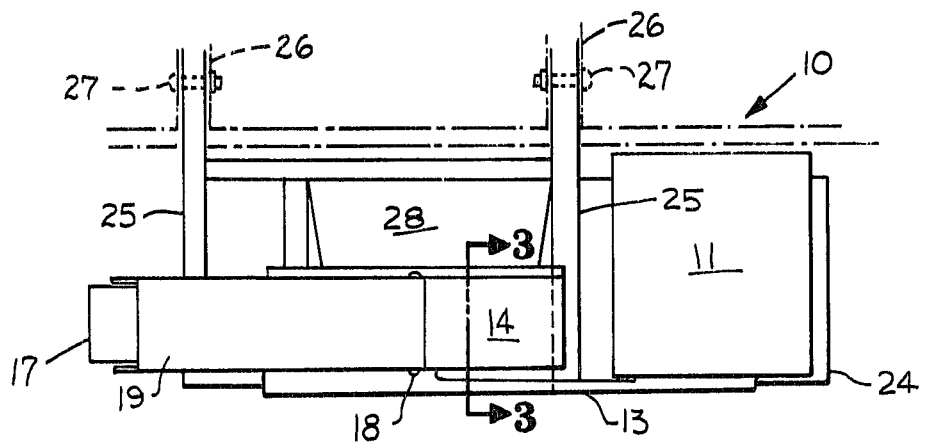
FIG. 2 is a sectional view, with some parts omitted for clarity, taken on the line 2—2 of FIG. 1.

Referring to FIGS. 1 and 2, the apparatus of the present invention is mounted, in a manner described hereinafter in detail, on the rear of a truck having an open body indicated generally at 10, with inwardly inclined bottom plates, in which the particulate material to be distributed is carried. The apparatus of the invention comprises an internal combustion engine indicated generally at 11, a discharge section indicated generally at 12, and a conventional drive belt (not shown) connecting the drive shaft of the engine and the discharge section, the drive belt being covered by a protective housing indicated generally at 13. The discharge apparatus includes a cylindrical housing or drum indicated generally at 14 having a circular peripheral rim 33 with an arcuate opening therein of about 55° to 60° in an upper quadrant thereof indicated at 14a. An impeller, indicated generally at 15, is keyed to a rotatable shaft 16 mounted within the housing 14. As shown in FIG. 1, the impeller 15 is mounted for rotation by the drive belt in a vertical plane in a counterclockwise direction. It will be understood that the impeller may be driven by a power takeoff from the truck motor, if desired, thereby eliminating the engine 11.

Overlying the arcuate opening 14a in the cylindrical housing is a planar extension 17 of substantially the same width as the cylindrical housing 14. The extension 17 is pivoted at one end by a substantially horizontal bolt or shaft 18 within a hood 19 for vertical movement within a limited range from a position approximately tangential to the top of the housing 14 to a position approximately 30° above a tangent. The hood 19 is secured to the housing 14 in a manner hereinafter described and overlies the top of the extension 17 throughout most of its length and depends downwardly on each side of the extension 17. The hood 19 may be open at the bottom, but preferably also has a bottom surface which is divergent from the extension 17.

Overlaying the hood 19 is a linkage 20, to the end of which is attached an arm 21 engaging extension 17 near its outer extremity for adjustment of the position thereof. The linkage 20 is operated by lever 22 which is nonrotatably secured to linkage 20, one end of lever 22 being pivotally secured at 22a to the top of the hood 19. The lever 22 may be moved to any desired position of adjustment of the extension 17 between a position tangential to the cylindrical housing 14 and about 30 percent above a tangent. Hydraulic means may be substituted for adjustment of the position of extension 17.

The cylindrical housing 14 is secured in place by a plurality of vertically disposed beams or angle iron members 23 extending, at the rear of the vertical sidewall of housing 14, about half the height thereof. The beams 23 are welded or otherwise attached to a horizontal supporting platform 24 on which is also mounted the engine 11.

The platform 24 as described above is conveniently mounted to the rear of the truck body 10 by means of a pair of channel of I-beams 25, as shown in FIG. 2. The beams 25 form, in effect, a continuation of the truck frame or chassis 26 and are bolted or otherwise secured thereto as indicated at 27.

A chute 28 depending downwardly from the outlet at the rear of the truck body communicates with an opening (not shown) in the lower portion of the cylindrical housing 14. Preferably a conveyor belt, driven by sprocket chains or other conventional means, (not shown) in the bottom of the truck body delivers the material to be discharged to the chute 28.

Figure 3:
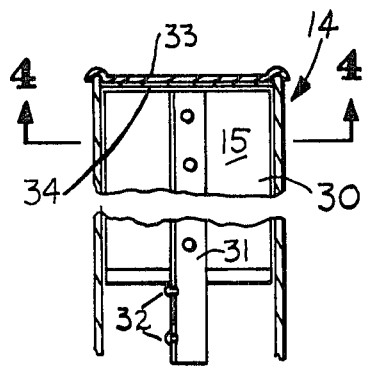
FIG. 3 is a fragmentary sectional view taken on the line 3—3 of FIG. 2.

Details of the construction of the radial impeller blades and arrangement thereof within the cylindrical housing 14 are illustrated in FIGS. 3, 4 and 5. Each impeller blade, indicated generally at 15, comprises a planar rectangular member 30 of high strength steel and an angle iron member 31 riveted, welded or otherwise secured to the member 30 centrally thereof. The angle iron 31 extends beyond one end of the member 30, and this extended end is provided with openings 32 for attachment by bolts or the like to the central hub surrounding the shaft 16.

As shown in FIGS. 3 and 4, the housing 14 surrounds the impeller blades with relatively small clearance therebetween. A flanged, outer circular rim 33 of the housing 14 is provided, having an inner lining 34, which may be spot welded thereto, of a corrosion and abrasion resistant steel of about 10 gauge thickness for protection against the effects of material such as powdered limestone, fertilizer or the like. The liner 34 may be formed from stainless steel or from a high-strength, abrasion resistant, low-alloy steel such as that sold under the registered trademark "COR-TEN" by United States Steel Corporation. The clearance between the outer extremities of the rotating blades 30 and the liner 34 should be maintained between about one-eighth and one-sixteenth in., and this clearance should be observed for satisfactory performance. The clearance between the sides of the cylindrical housing 14 and the side edges of the blades 30 in less critical but preferably should be on the order of about one-half in.

As shown in FIG. 5, where the direction of the impeller blades is counterclockwise, material picked up by the blades is released at approximately the top dead center position of each blade and discharged through the opening 14a in the periphery of the cylindrical housing and impelled outwardly between the depending sides of the hood 19 and the extension 17. The extension 17 and the hood 19 do not act in the manner of a nozzle, and there is substantially no deposit of the particulate material on the interior surfaces of the hood 19 nor on the extension 17. It has been found that the extension 17 and depending sidewalls of the hood 19 should be substantially parallel to the direction of movement of the discharged material. If the material impinges on these surfaces at an angle of more than a few degrees, the trajectory of the material is considerably shortened, and a uniform pattern of distribution cannot be obtained. The cross-sectional discharge area within the hood 19 is at least substantially equal to the area of arcuate opening 14a. The extension 17 and hood 19 therefore function more in the nature of a guide or shield, rather than a nozzle.

Figure 6:
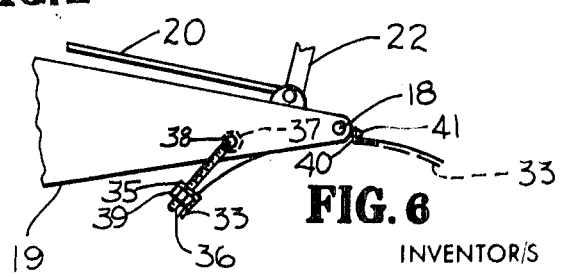
FIG. 6 is a fragmentary view on an enlarged scale of a part of the apparatus of FIG. 1.

In order to permit the trajectory of the discharged material to be raised or lowered to accommodate the topography of the terrain or to clear intervening obstacles, means are provided for rotating the rim 33, its attached liner 34, the extension 17 and hood 19, relative to the sidewalls of housing 14, thereby raising or lowering the position of the opening 14a relative to the horizontal. As shown in FIG. 6, and outwardly turned flange 35 is formed on the trailing edge of rim 33, with respect to the direction of rotation of the blades, having two openings through which pass a pair of threaded bolts 36. The bolts are formed with heads 37 turned at about right angles to the shanks. The shanks of the bolts pass through openings 38 in the sides of the hood 19 with the heads 37 flush against the inner surfaces of the hood sides. The lower threaded ends of the shanks pass through the openings in the flange 35, and flanged rim 33 is tightened around the sidewalls of housing 14 by threading nuts 39 on the bolts 36. At the leading edge of rim 33, with respect to the direction of rotation of the blades, an outwardly flanged or curved portion 40 is provided which is secured to the end of hood 19 by riveting, welding, or bolts, as indicated at 41, adjacent the horizontal shaft 18 through the hood 19. The hood is thus secured to the rim 33 by bolts 36 and 41.

From the above description it will be understood that the rim 33 may be loosened, by unscrewing nuts 39, sufficiently to permit it to be rotated, along with the hood 19 and extension 17, around the sidewalls of housing 14 so as to vary the relative position of opening 14a. The rim 33 is then clamped in the desired position by tightening nuts 39, thereby drawing the flanged edges of the rim tight around the sidewalls of housing 14.

FIG. 7 illustrates in diagrammatic fashion the manner of operation when treating a strip about 100 feet wide along the edge of a highway. The truck moves along the edge of the rod discharging material in a path about 25 to 30 feet wide in the first pass. After moving the desired distance down the road, the truck returns to its starting point and after suitable adjustment of the extension 17, or rotatable adjustment of the cylindrical drum 14 if necessary, similar second, third and fourth passes are carried out, each covering a bordering or slightly overlapping path of about 25 or 30 ft. width.

Apparatus of the type described above having an impeller section of 48 in. diameter driven at about 800 r.p.m. has been found to be capable of applying 100 tons per day of ground limestone and requires the services of only one operator to drive the truck. Although it has been indicated that the apparatus of this invention discharges dry material, it should of course be understood that it is equally effective in discharging material containing moisture, and in fact the problem of dusting can be alleviated by applying water to the material when loading it into the hopper of the truck. The presence of moisture is not damaging so long as it is insufficient to cause extreme agglomeration or lumping of material.

Figure 8:
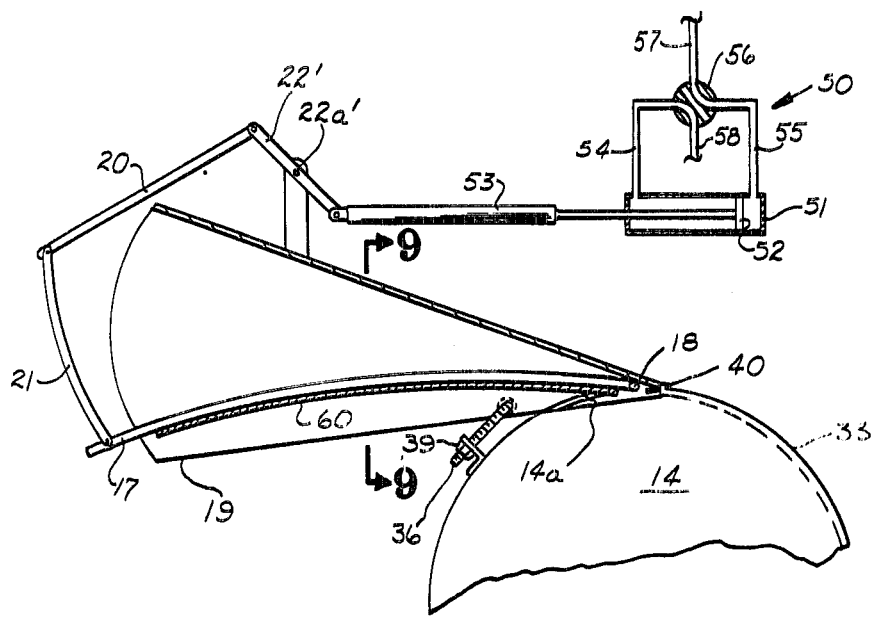
FIG. 8 is a schematic, fragmentary sectional elevation of a modification of the embodiment of FIG. 1.
Figure 9:
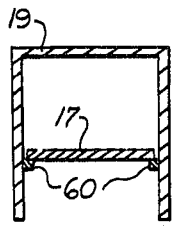
FIG. 9 is a fragmentary sectional view on the line 9—9 of FIG. 8.

FIGS. 8 and 9 illustrate a modification having particular utility for discharging material a short distance over an intervening obstacle and distributing the material just beyond the intervening obstacle. In this figure parts corresponding to like parts of FIGS. 1 and 6 are given like reference numerals.

As shown in FIG. 8 the extension 17 is engaged, near its outer end, by arm 21, which in turn is pivotally mounted at one end of linkage 20, the other end of linkage 20 being pivotally secured to lever 22' having a fulcrum 22a'. The elements 20, 21 22' and 22a' are preferably actuated by a hydraulic mechanism indicated generally at 50, which may be controlled in conventional manner from the cab of the vehicle, whereby the extension 17 may be raised and lowered.

The hydraulic mechanism 50 comprises a cylinder 51 mounted on the rear of the truck body, a piston 52 reciprocable within cylinder 51, and a connecting rod 53 from the piston pivotally secured at its outer end to lever 22'. Hydraulic supply and exhaust lines 54 and 55, respectively, communicate with opposite ends of cylinder 51, and a hydraulic valve 56 of conventional design places the lines 54 or 55 alternatively in communication with a source of pressure fluid in line 58, and with fluid return line 57. It will of course be apparent that supply of pressure fluid to line 54 removes the piston 52 to the right in FIG. 8, thereby causing elements 53, 22', 20 and 21 to move extension 17 downwardly. Reversal of the valve 56 to supply pressure fluid to line 55 causes piston 52 to move to the opposite end of cylinder 51, thereby raising extension 17.

On each sidewall of hood 19 a curvilinear, inwardly extending flange 60 is secured by welding, bolts, or in like manner, at a position which contacts each side edge of extension 17 and interrupts its downward movement by the hydraulic mechanism as shown in FIG. 9. The extension 17 is somewhat flexible and hence bends downwardly to conform to the curvilinear shape of flange 60 when urged downwardly by the hydraulic mechanism, thereby forming an outlet of slightly constructed area for material discharged from arcuate opening 14a between the outer extremities of extension 17, bottom surface and sidewalls of hood 19. FIG. 8 illustrates the position of extension 17 in its lowermost adjustment. The slightly downward curved surface of extension 17, together with the action of gravity, causes the discharged material to describe a short trajectory ideally suited to clear an obstacle such as a highway guardrail and to be deposited shortly beyond the obstacle in a uniform pattern even through the terrain may be uneven or may slope downwardly.

It will be understood that the hydraulic mechanism of FIG. 8 may be substituted for the lever 22 and pivot 22a in the embodiment of FIG. 1 and 6.

From the above description it will —be apparent that there is thus provided apparatus of the character described possessing the particular features of advantages before enumerated as desirable, but which is susceptible of modification in its form, proportions, details of construction and arrangement of parts without departing from the principle involved or sacrificing any of its advantages. The invention is therefore claimed in any of its forms or modifications within the legitimate scope of the appended claims.

The embodiments of the invention in which an exclusive property or privilege is claimed are defined as follows:

1. Apparatus for distributing material from a moving vehicle, comprising a cylindrical housing having a circular peripheral rim, a plurality of radial impeller blades mounted on a shaft for rotation in said housing, drive means for rotating said shaft and blades, means for feeding said material into a lower region of said housing, an arcuate opening in an upper region of said peripheral rim through which said material is discharged, an elongated extension pivotally mounted at one end thereof adjacent the leading edge of said opening with respect to the direction of rotation of said impeller blades, means engaging the other end of said extension for upward and downward movement about said pivotal mounting, and a hood surrounding said extension at least on the top and two sides thereof.

2. Apparatus for distributing material from a moving vehicle, comprising a cylindrical housing having a circular peripheral rim, a plurality of radial impeller blades mounted on a shaft for rotation in said housing, drive means for rotating said shaft and blades, means for feeding said material into a lower region of said housing, an arcuate opening in an upper region of said peripheral rim through which said material is discharged, an elongated planar extension pivotally mounted at one end thereof adjacent the leading edge of said arcuate opening with respect to the direction of rotation of said impeller blades, means engaging the other end of said extension for upward and downward movement thereof about the pivotal mounting between a position approximately tangential to said housing and a position approximately 30° above tangential, and a hood surrounding said extension at least on the top and two sides thereof.

3. The apparatus claimed in claim 1, including means for rotatable adjustment of said peripheral rim relative to said housing, whereby to change the position of said arcuate opening relative to the horizontal.

4. The apparatus claimed in claim 3, wherein said means for rotatable adjustment of said peripheral rim comprise an outwardly turned flange on the trailing edge of said rim, with respect to the direction of rotation of said blades, a pair of threaded bolts having shanks passing through openings in said flange and heads angularly related to said shanks, said heads being engaged through openings in the sides of said hood, nuts threadably engaged on the shanks of said bolts, a second outwardly turned flange on the leading edge of said rim, with respect to the direction of rotation of said blades, said second flange being secured to an end of said hood adjacent said one end of said planar extension, whereby loosening of said nuts causes release of said rim from clamping relationship to the sidewalls of said housing.

5. The apparatus claimed in claim 1, including means for securing said housing and drive means onto the rear of said moving vehicle, and wherein said means for feeding said material includes a downwardly inclined chute communicating with a source of supply of material in said vehicle and terminating at said lower region of said housing.

6. The apparatus claimed in claim 1, wherein said impeller blades are of rectangular configuration and have a clearance of from about one-eight to one-sixteenth inch with the circular rim of said housing.

7. The apparatus of claim 1, wherein said arcuate opening in said peripheral rim is from about 55°to about 60°.

8. The apparatus of claim 1, wherein said means engaging said other end of said extension include a hydraulic mechanism actuating upward and downward movement of said extension.

9. The apparatus of claim 8, including a curvilinear flange extending inwardly from each sidewall of said hood, said flange being positioned to contact each side edge of said extension and interrupt the downward movement thereof, said extension having sufficient flexibility to conform to said curvilinear flange when urged downwardly by said hydraulic mechanism, whereby to cause material discharged from said arcuate opening to describe a short trajectory.